Patented Nov. 8, 1938

2,135,979

UNITED STATES PATENT OFFICE 2,135,979

PREPARATION OF MIXED ESTERS OF CELLULOSE

Carl J. Malm, Rochester, N. Y., assignor to Eastman Kodak Company, Rochester, N. Y., a corporation of New Jersey No Drawing. Application October 27, 1936, Serial No. 107,904

6 Claims. (Cl. 260—101)

This invention relates to the preparation of mixed esters of cellulose containing acetyl groups and groups of 3–4 carbon atoms in a bath in which the higher acyl is at least 40% of the total acyl content, to which bath substantially no propionic or butyric anhydride has been added.

The present invention is particularly directed to processes employing no more than the usual proportions of esterification bath to cellulose of like processes in which propionic or butyric anhydride has been used.

Up to now it has been the general impression in the cellulose derivative art that to prepare cellulose acetate propionate or cellulose acetate butyrate in the usual esterification bath containing a higher acyl content of more than 40%, that the use of propionic or butyric anhydride therein was necessary to obtain a satisfactory product. For instance, if it was attempted to prepare these esters using acetic anhydride as the only anhydride therein, break-down or degradation of the cellulose would result under ordinary esterification conditions. In other cases where it has been attempted to prepare these esters omitting the higher anhydrides in which the pretreating or presoaking of the cellulose was also omitted, the esters formed were hazy and gelling of the reaction mixture often occurred. To my knowledge, no one has been able to satisfactorily prepare cellulose acetate propionate or cellulose acetate butyrate in an esterification in which the acyl of 3–4 carbon atoms constituted 40% of the total acyl content of the esterification bath without having supplied a substantial amount of propionic or butyric anhydride in making up the bath.

The object of my invention is to provide a method of preparing mixed cellulose esters containing acetyl and propionyl and/or butyryl groups in an esterification bath in which at least 40% of the total acyl is propionyl and/or butyryl without supplying propionic or butyric anhydride thereto and using the same proportion of liquid to cellulose which is usually employed when prionic or butyric anhydride has been been added. Other objects will appear herein. Another object of my invention is to provide a process for making mixed cellulose esters containing acetyl and propionyl and/or butyryl groups in which the more expensive higher acid anhydrides may be dispensed with and in which no greater proportion of liquid to cellulose need be used than in processes where it is necessary to supply those anhydrides.

I have found that mixed cellulose esters, of the type referred to, may be prepared in an ordinary esterification without using propionic or butyric anhydride, by presoaking the cellulose in not more than three parts of lower fatty acid to one of cellulose, at least 40% being acetic acid. At least ¼ part of acid to every part of cellulose should be employed.

I have found that by this means an adequate presoaking and activation of the cellulose occurs so that it is readily susceptible to subsequent esterification and the addition of a higher anhydride to the esterification mixture becomes unnecessary to obtain a satisfactory product. I have found that by my process in which these more expensive higher anhydrides may be dispensed with, the cost of producing the mixed esters of cellulose containing substantial amounts of propionyl or butyryl is considerably reduced without disturbing the quality of the product in any way. I have found that propionic acid (or butyric acid) should be used in as large a quantity as possible in the esterification proper, but yet the amount of this acid, which is employed in the presoaking, should be limited. Previously, the fact that the presoaking should have low propionyl and the esterification bath should have high propionyl was compensated for in preparing esters having a substantial quantity of propionyl or butyryl by adding propionic or butyric anhydride to the esterification mixture. In order to make up this deficiency from the absence of propionic or butyric anhydride in the esterification mixture, a large amount of propionic or butyric acid should be used to supply propionyl or butyryl groups and a sufficient amount of acetic anhydride to supply the necessary anhydride for esterification should also be supplied. To increase the amounts of propionic or butyric acid and of acetic anhydride, the amount of acetic acid, which is very necessary to the activation of the cellulose should be limited. I have discovered a combination in which the acetic acid can be so limited and yet give a good activation of the cellulose without being present in so large an amount as to make the supplying of propionic or butyric anhydride to the esterification bath necessary.

As an illustration of my process, the cellulose may be treated with ¼–3 parts of lower fatty acid, containing at least 40% acetic acid, until the cellulose is sufficiently activated. This usually takes place in about four hours at a temperature of 100–110° F. My invention, however, is not limited to this particular time and temperature of presoaking, as the temperature employed might be even 120 or 130° F. or below 100° F. and the time might be either longer or shorter than four hours, depending a great deal on the temperature of treatment. For instance, cellulose might be moistened with an equal amount of acetic acid and be kept in an air-tight container for 12 hours or longer at room temperature in order to activate it. In the presoaking of the cellulosee it is preferred, although not essential, that this step be carried out in an enclosed container so that the full effect of the acetic acid is exerted upon the cellulose without any loss. The presoaking or activation temperatures may also be much greater than specified. For instance, temperatures up to 180–220° F. might be employed in the presoaking, if desired.

After the presoaking, it is preferred to add some propionic or butyric acid to the mass. This addition permits faster cooling of the presoaked mass due to the presence of additional liquid and, therefore, saves time in the carrying out of the process. After cooling the mass to the extent desired, a mixture of propionic or butyric acid, acetic anhydride and sulfuric acid is added thereto and the temperature is maintained at the point desired, depending upon the type of ester which is being produced. It is desirable that an acetic anhydride of high concentration be employed, such as 95%, in order to keep the percentage of acetic acid low in the esterification bath. This becomes more desirable the greater the proportion of acetic acid to cellulose in the presoaking. If a high viscosity ester is being produced, it is preferred to refrigerate the mixture of propionic or butyric acid, acetic anhydride and catalyst before adding it to the mass to permit proper control of the temperature as described and claimed in my copending application Serial No. 73,138, filed April 7, 1936. As an illustration of a mixture which may be added, this mixture may be made up of two mols of propionic acid, one mol of acetic anhydride and a small proportion of acylation catalyst, depending upon the process which is employed. As will be seen by the examples, these proportions are merely illustrative and may be varied considerably within the limits of my invention.

The following specific examples illustrate processes of preparing cellulose esters in accordance with my invention:

*Example I*

This example illustrates the preparation of a cellulose acetate propionate of fairly high viscosity. A mixture of 400 pounds of refined cotton linters and 900 pounds of glacial acetic acid was kept for four hours at 110° F. 860 pounds of 100% propionic acid was added thereto and the mixture was cooled to 50° F. A mixture of 1,060 pounds of 95% acetic anhydride, 1,100 pounds of 100% propionic acid and 7,200 cc. of sulfuric acid was prepared and cooled to 20° F. This mixture was added to the mixer containing the presoaked cellulose and the lower fatty acids inducing esterification. The temperature of the reaction was allowed to rise to a maximum of 80° F. The reaction was continued until a dope free from grain and fiber and having first stage viscosity of about 200 seconds was obtained. 1,000 pounds of 50% acetic acid was then added and the hydrolysis was carried out at 100° F. for about 10–14 hours or until the desired solubility was reached.

In a process of this nature in which a low temperature is used, it is desirable to add propionic acid to the cotton-acetic acid mixture before cooling it due to the fairly high temperature of solidification exhibited by acetic acid. Also, in this example, the mixture containing anhydride and catalyst was refrigerated prior to mixing with the cellulose.

Instead of propionic acid, butyric acid may be employed in similar proportions with like results.

*Example II*

This example illustrates the preparation of a cellulose acetate butyrate of fairly low viscosity where a low ratio of liquid to cellulose is employed.

500 pounds of cotton was treated with 500 pounds of acetic acid for four hours at 100° F. 800 pounds of butyric acid was then added and the mixture was cooled to 80° F. A mixture of 1,350 pounds of butyric acid, 1,350 pounds of 95% acetic anhydride and 2,000 cc. of sulfuric acid was added and the esterification was carried out to a maximum temperature of 140° F. until a first stage viscosity of 10 seconds was obtained.

If the cellulose acetate butyrate prepared is to be precipitated without hydroylsis, 200 pounds of 50% acetic acid is added. The mass is then cooled to 100° F. and precipitation is carried out, as described in my Patent No. 2,030,883. If the batch is to be hydrolyzed, 600 pounds of 50% acetic acid is added and the batch is allowed to stand at 100° F. until the desired amount of hydrolysis takes place after which precipitation may be carried out, as described in my Patent No. 2,030,883.

If desired, propionic acid may be employed instead of butyric acid in the above example.

Instead of cotton or refined cotton linters, other forms of cellulose may be employed as the starting material. Refined sulfite wood pulp, having a high alpha cellulose content, is an example of a suitable starting material. As may be noted from the above examples, the proportion of catalyst employed may be varied depending upon the type of ester which it is desired to prepare. Also, the proportions of propionic or butyric acid may be varied in accordance with the amount of propionyl or butyryl which is desired in the product to be prepared. These proportions may be varied as desired, by the individual operator.

As pointed out above, my invention is especially adapted to the preparation of the high viscosity esters of the type described due to the necessity of presoaking in order to obtain uniform esterification at the temperature necessary to prepare a high viscosity product. It is only by the procedure which I have discovered that the addition of propionic or butyric anhydride may be omitted and yet adequate activation of the cellulose to prepare the desired product may be obtained. In general, it may be stated that in preparing a high viscosity product, the temperature of the reaction should only be allowed to reach a maximum of 80° F., while with the regular viscosity esters, a maximum of 100–110° F. would be permissible. The temperature of the low viscosity esters may be allowed to rise to a maximum of 150° F. The maximum temperature will, of course, be determined by the particular viscosity product which it is desired to produce.

My invention is particularly concerned with the practical operation of a process of making cellulose esters. In practical operation the proportion of esterification bath to cellulose is as low as possible for the sake of economy. Heretofore when a minimum of esterifying liquid was used, dispensing with the propionic or butyric anhydride in a bath of which 40% of the total acyl was propionyl or butyryl, was believed to be impossible.

The usual ratio of esterifying liquid to cellulose in preparing the low viscosity cellulose esters in which 40% of the total acyl is propionyl or butyryl is approximately 7:1 while in the case of the high viscosity cellulose esters it is approximately 10:1. It is for these proportions that my invention is particularly adapted altho it is suitable for use in esterifying cellulose in which 40% of the total acyl of the esterifying bath is propionyl and/or butyryl, the remainder being acetyl, with various proportions of bath to cellulose.

In the examples, the first stage viscosity of the ester is given. This viscosity was determined as follows:

20 gms. of the esterification dope was weighed out into a 100 cc. beaker and 20 cc. of a mixture of equal parts by volume of glacial acetic acid and tetrachlorethane was added thereto. When the whole was homogeneous and free from lumps, it was cooled to 25° C. and poured into a 12 mm. diameter tube which was kept at 25° C. The viscosity was obtained by noting the time (in seconds) required for a ⅛ inch glass bead, weighing .05 gm., to drop thru a 10 cm. column of the liquid.

I claim:

1. The process of preparing a mixed cellulose ester containing acetyl and fatty acid groups of 3–4 carbon atoms which comprises presoaking one part of cellulose in ¼–3 parts of a bath essentially consisting of lower fatty acid of 2–4 carbon atoms as the only acid therein, acetic acid being predominant, adding fatty acid of 3–4 carbon atoms, and subsequently inducing esterification of the cellulose by adding a mixture of fatty acid of 3–4 carbon atoms, sufficient acetic anhydride to induce esterification, being substantially the only fatty acid anhydride present and an acylation catalyst, at least 40% of the total acyl in the esterification bath being fatty acid groups of 3–4 carbon atoms.

2. The process of preparing a mixed cellulose ester containing acetyl and fatty acid groups of 3–4 carbon atoms which comprises presoaking one part of cellulose in ¼–3 parts of a bath essentially consisting of lower fatty acid of 2–4 carbon atoms as the only acid therein, acetic acid being predominant, at a temperature of at least 100–110° F., adding fatty acid of 3–4 carbon atoms, and subsequently inducing esterification of the cellulose by adding a mixture of fatty acid of 3–4 carbon atoms, sufficient acetic anhydride to induce esterification, being substantially the only fatty acid anhydride present and an acylation catalyst, at least 40% of the total acyl in the esterification bath being fatty acid groups of 3–4 carbon atoms.

3. The process of preparing a high viscosity mixed ester of cellulose containing acetyl and fatty acid groups of 3–4 carbon atoms which comprises presoaking one part of cellulose in ¼–3 parts of a bath essentially consisting of lower fatty acid of 2–4 carbon atoms as the only acid therein, acetic acid being predominant at a temperature of approximately 100–110° F., cooling, subsequently inducing esterification by adding a refrigerated mixture of fatty acid of 3–4 carbon atoms, sufficient acetic anhydride to induce esterification, being substantially the only fatty acid anhydride present and an acylation catalyst, at least 40% of the total acyl in the esterification bath being fatty acid groups of 3–4 carbon atoms, allowing the temperature to rise to a maximum not greater than 80° F. and continuing the reaction until the dope is free from grain and fiber.

4. The process of preparing a high viscosity cellulose acetate propionate which comprises presoaking one part of cellulose in ¼–3 parts of a bath essentially consisting of lower fatty acid of 2–3 carbon atoms as the only acid therein, acetic acid being predominant, at a temperature of approximately 100–110° F., adding propionic acid, cooling, and subsequently inducing esterification by adding a refrigerated mixture of propionic acid, sulfuric acid and sufficient acetic anhydride to induce esterification, being substantially the only fatty acid anhydride present, at least 40% of the total acyl in the esterification bath being propionyl, allowing the temperature to rise to a maximum not greater than 80° F. and continuing the reaction until the dope is free from grain and fiber.

5. The process of preparing a high viscosity cellulose acetate butyrate which comprises presoaking one part of cellulose in ¼–3 parts of a bath essentially consisting of lower fatty acid of 2–4 carbon atoms as the only acid therein, acetic acid being predominant, at a temperature of approximately 100–110° F., adding butyric acid, cooling, and subsequently inducing esterification by adding a refrigerated mixture of butyric acid, sulfuric acid and sufficient acetic anhydride to induce esterification, being substantially the only fatty acid anhydride present, at least 40% of the total acyl in the esterification bath being butyryl, allowing the temperature to rise to a maximum not greater than 80° F. and continuing the reaction until the dope is free from grain and fiber.

6. The process of preparing a high viscosity mixed ester of cellulose containing acetyl and fatty acid groups of 3–4 carbon atoms which comprises presoaking one part of cellulose in approximately 2¼ parts of glacial acetic acid for four hours at 110° F., adding approximately 2.15 parts of fatty acid of 3–4 carbon atoms thereto, cooling to 50° F., adding a mixture of acetic anhydride, fatty acid of 3–4 carbon atoms and sulfuric acid having a temperature of 20° F. to the mass, allowing the temperature of the reaction to rise to a temperature not exceeding 80° F. and continuing the reaction until the dope is free from grain and fiber.

CARL J. MALM.